(No Model.)
W. H. TILLOU.
SUPPLEMENTARY SEAT FOR VEHICLES.
No. 475,954. Patented May 31, 1892.
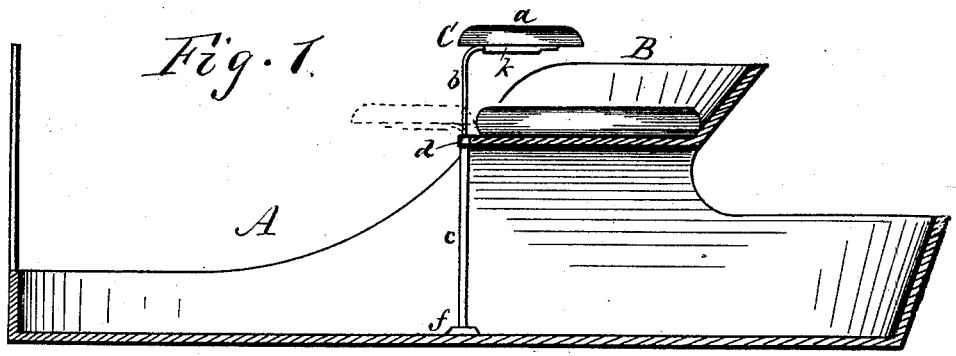
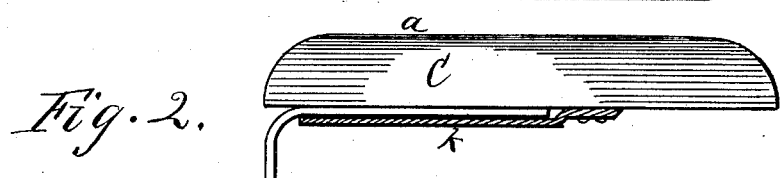
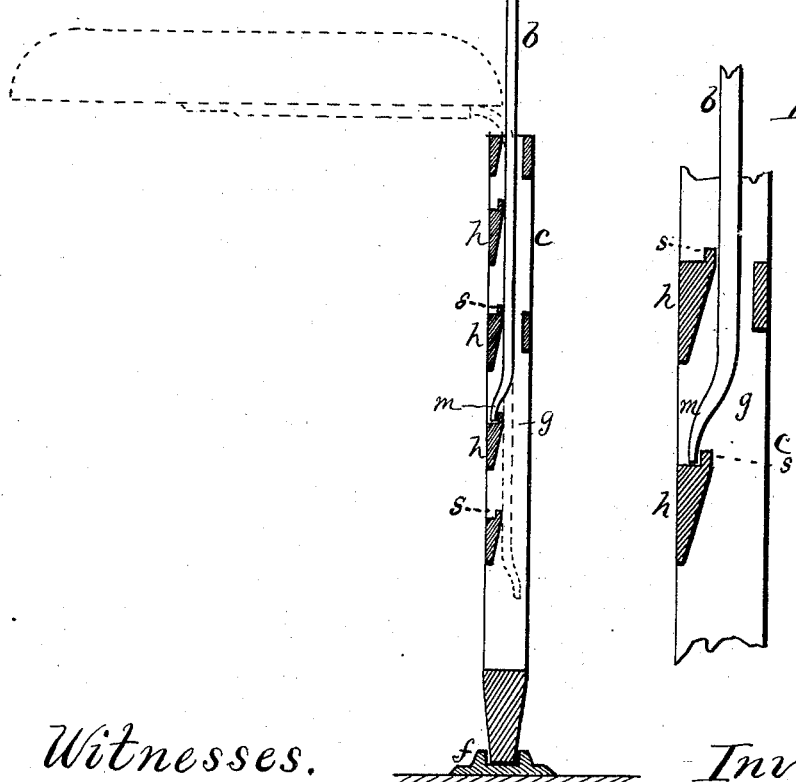
Witnesses.
Inventor.

UNITED STATES PATENT OFFICE.

WILLIAM HENRY TILLOU, OF LE ROY, NEW YORK.

SUPPLEMENTARY SEAT FOR VEHICLES.

SPECIFICATION forming part of Letters Patent No. 475,954, dated May 31, 1892.

Application filed May 6, 1891. Serial No. 391,763. (No model.)

*To all whom it may concern:*

Be it known that I, WILLIAM HENRY TILLOU, of Le Roy, in the county of Genesee and State of New York, have invented a certain new and useful Improvement in Supplementary Seats for Vehicles; and I do hereby declare that the following is a full, clear, and exact description of the same, reference being had to the drawings accompanying this specification.

My improvement relates to supplementary seats for vehicles, whereby a third person can ride with ease and comfort to all the occupants of the carriage. Such devices in various forms are well known, and I do not claim such, broadly.

My invention consists of a seat constructed, arranged, and operating as hereinafter more fully described and definitely claimed.

In the drawings, Figure 1 is a longitudinal vertical section of a vehicle body and seat, showing the attachment in elevation. Fig. 2 is an enlarged sectional elevation of the supplementary seat and its attachments. Fig. 3 is an enlarged sectional view of a portion of the standard.

A indicates a vehicle-body, and B the ordinary seat.

C is the supplementary seat, which is the subject of my invention. It consists of a seat proper $a$, a shank $b$, attached removably thereto, and a standard $c$, in which the shank slides and is adjusted to different heights. The standard $c$ is attached at $d$ to the front edge of the main seat and centrally of the same, its lower end being fitted in a socket-piece $f$, screwed to the bottom of the vehicle-body. The standard remains permanently in this position, and as it is of small size in cross-section and is secured outside or in front of the curtain or cover of the main seat it forms no impediment in ordinary use. It is provided with a socket or passage $g$, in which the shank $b$ slides freely up and down, and this socket is formed on the inner front side with a series of ratchets or teeth $h\ h$, as shown in Fig. 2. The shank $b$ of the supplementary seat is preferably attached to the seat by sliding into a socket-piece $k$, fastened on the under side of the seat. The shank is bent and extends down vertically nearly or quite in line with the front edge of the seat, the latter projecting back of the shank its whole width. On this depends the efficiency of the device, as by this means the weight applied on top acts as a lever to hold the detent in the ratchets when the seat is elevated, as shown by the full lines in the drawings. On the lower end of the shank $b$, which rests in the socket of the standard, is a small curved detent or projection $m$, which engages with the ratchets or teeth. Thus arranged the supplementary seat can be used either in the raised or depressed position indicated by the full and dotted lines, Fig. 1. In the raised position the seat points inward and rests above the main seat at such a height that it is elevated above the knees of the occupants of the main seat. In the depressed position the seat is shifted so as to point outward and then stands on a level with the cushion of the main seat, the occupant of the supplementary seat then sitting outside the main seat. In such case the supplementary seat fits down close to the top of the standard and is supported by it. When the seat is elevated, as shown in full lines, the weight of the occupant causes the shank $b$ to cramp in its socket and brings the detent $m$ into engagement with the ratchet $h$, which hold it elevated. So long as the weight rests on the seat the leverage holds the detent in close engagement with the ratchet and prevents any possibility of slipping. This effect is produced by the projection of the seat beyond the shank, as before described. By this means, also, the supplementary seat can be adjusted higher or lower. When the seat is not in use, it can be removed from the socket and packed away.

The ratchet-teeth $h$ are made in the form shown in Figs. 2 and 3—that is, with open spaces between them and with shoulders $s\ s$ at the top on the back side, which prevent accidental displacement or slipping out of the detent.

Having described my invention, I do not claim, broadly, a carriage-seat adjustable to different positions. Neither do I claim, broadly, a hollow standard provided with ratchet-teeth and a seat-shank provided with a pawl engaging therewith.

What I claim as new, and desire to secure by Letters Patent, is—

The combination, with the hollow standard $c$, provided with the ratchet-teeth $h\,h$, having shoulders $s\,s$ at their tops, of the shank $b$, provided at its lower end with the curved detent $m$, engaging with the ratchet-teeth, and the seat $C$, attached to the top of the shank and on one side of the same, as shown and described, and for the purpose specified.

In witness whereof I have hereunto signed my name in the presence of two subscribing witnesses.

WILLIAM HENRY TILLOU.

Witnesses;
WILLIAM HARRIS,
S. A. CURTISS.